United States Patent [19]

Ichimura et al.

[11] Patent Number: 5,373,208
[45] Date of Patent: Dec. 13, 1994

[54] DC MOTOR WITH ANTI-VIBRATION BRUSH MOUNTS

[75] Inventors: Hidenao Ichimura; Shunji Matsushima; Masataka Kurata, all of Nagano, Japan

[73] Assignee: Kabushiki Kaisha Sankyo Seiko Seisakusho, Nagano, Japan

[21] Appl. No.: 97,894

[22] Filed: Jul. 28, 1993

[30] Foreign Application Priority Data

Jul. 29, 1992 [JP] Japan .................. 4-058708[U]

[51] Int. Cl.⁵ .................. H02K 1/02; H02K 21/26; H02K 13/10
[52] U.S. Cl. .................. 310/154; 310/42; 310/51; 310/242
[58] Field of Search .................. 310/42, 43, 51, 154, 310/235, 242, 245, 249

[56] References Cited

U.S. PATENT DOCUMENTS

| | | |
|---|---|---|
| 3,165,654 | 1/1965 | Mabuchi .................. 310/46 |
| 4,023,057 | 5/1977 | Meckling .................. 310/154 |
| 4,933,582 | 6/1990 | Hata et al. .................. 310/154 |

FOREIGN PATENT DOCUMENTS 64-54754  4/1989  Japan .

*Primary Examiner*—Steven L. Stephan
*Assistant Examiner*—D. R. Haszko
*Attorney, Agent, or Firm*—Sughrue, Mion, Zinn, Macpeak & Seas

[57] ABSTRACT

Disclosed is a dc motor comprising a motor frame; a flexible magnet fixed on the motor frame; a rotor having a rotor core, the rotor core having windings and confronting the flexible magnet; a rotating shaft for rotating integrally with the rotor; a commutator secured to the rotating shaft; a brush body coming in slidable contact with the commutator and supplying power to control driving of the rotor; a brush body holder, made of an insulating resin, for holding the brush body; and an engaging device for engaging the brush body with the flexible magnet.

8 Claims, 3 Drawing Sheets

DC MOTOR WITH ANTI-VIBRATION BRUSH MOUNTS

BACKGROUND OF THE INVENTION

1. Field of the Invention

The invention relates to dc motors, and more particularly to a structure for holding terminals or brush springs thereof.

2. Related Art

Dc motors are generally driven by direct current and rectify current flowing in their rotor using a brush body (brush springs and terminals) 40 and a commutator.

An exemplary dc motor will be described with reference to the drawings. In FIG. 7, an end plate 38 is fitted to and fixed on an open end of a bottomed cylindrical motor frame 21. The end plate 38 has a recessed portion in the middle thereof, and has brush body holders 29, 29 that are fixed while passing through the end plate 38 in the thickness direction. The brush body holders 29, 29 are formed of an insulating resin or the like so as to interpose the recessed portion therebetween. In each brush body holder 29 is a plurality of terminals (a part of the brush body 40) 30 firmly embedded by pressure. The terminals serve to supply the power. Base end portions of brush springs (a part of the brush body 40) 28 are mounted on the terminals 30, each brush spring 28 extending in a direction orthogonal to a rotating shaft (described later). The front end portion of each brush spring 28 is divided into a plurality of slits. A magnet 22 is mounted on an inner circumferential surface of the motor frame 21, and a through hole is formed on the upper middle portion thereof. Bearings 33, 33' are mounted on the through hole on the upper middle portion of the motor frame 21 and the recessed portion in the middle of the end plate 38, respectively. The rotating shaft 27 is inserted into the central holes of the bearings 33, 33', so that the rotating shaft 27 is supported by the bearings 33, 33' so as to be rotatable relative to the motor frame 21 and the end plate 38. A rotor core 23 is mounted on the rotating shaft 27 substantially in the middle thereof lengthwise. The rotor core 23 is formed by laminating a plurality of core elements made of a magnetic material. The rotor core 23 has a plurality of salient poles on the outer circumference thereof. A winding 24 is wound around each of these salient poles to thereby form a rotor 25. The outer circumferential surface of the rotor core 23 confronts the magnet 22 mounted on the inner circumferential wall of the motor frame 21.

A commutator 36 is mounted at a lower portion below the rotor core 23 of the rotating shaft 27 as viewed in FIG. 7. The commutator 36 is cylindrical and has a plurality of partially cylindrical segments mounted on the surface thereof. The front end portion of each of the brush springs 28, 28 abuts against the surface of the commutator 36, and by controlling the driving of the winding 24 through the commutator 36, the rotor 25 is energized to thereby rotate the rotating shaft 27. An example of such a dc motor is disclosed in Japanese Utility Model Unexamined Publication No. 54754/1989.

As described above, the conventional dc motor is generally arranged so that the terminal 30 is fixed on the brush body holder 29 by pressure. However, such arrangement may, in some cases, allow the terminal 30 inside the motor to come out of the brush body holder 29 when the motor receives thermal stress and mechanical stress from outside. Further, vibration of the brush springs 28 is transmitted to the brush body holders 29 through the terminals 30, thereby not allowing the brush body holders 29 to absorb such vibration adequately. As a result, the vibration becomes the source of mechanical noise.

SUMMARY OF THE INVENTION

The invention has been made to overcome the above problems. Accordingly, the object of the invention is to provide a dc motor which prevents the brush body (the terminals and the brush springs) from coming out and which produces less mechanical noise.

According to the present invention, there is provided a dc motor comprising a motor frame; a flexible magnet fixed on the motor frame; a rotor having a rotor core, the rotor core having windings and confronting the flexible magnet; a rotating shaft for rotating integrally with the rotor; a commutator secured to the rotating shaft; a brush body coming in slidable contact with the commutator and supplying power to control driving of the rotor; a brush body holder, made of an insulating resin, for holding the brush body; and an engaging device for engaging the brush body with the flexible magnet.

According to the invention, a projecting portion that projects toward the flexible magnet is formed on the brush body (the terminal or the brush spring), and this projecting portion is secured to the flexible magnet. Therefore, the fixing rigidity of the brush body (the terminal or the brush spring) is improved and the terminal no longer comes out of the brush body holder even if stresses or the like are applied from outside. Further, noise of the brush body (the terminal or the brush spring) is released to the flexible magnet, thereby contributing to reducing not only noise attributable to the rotation of the dc motor but also mechanical noise.

DETAILED DESCRIPTION OF THE PREFERRED EMBODIMENTS

Preferred embodiments will now be described with reference to the drawings.

Figure 1:
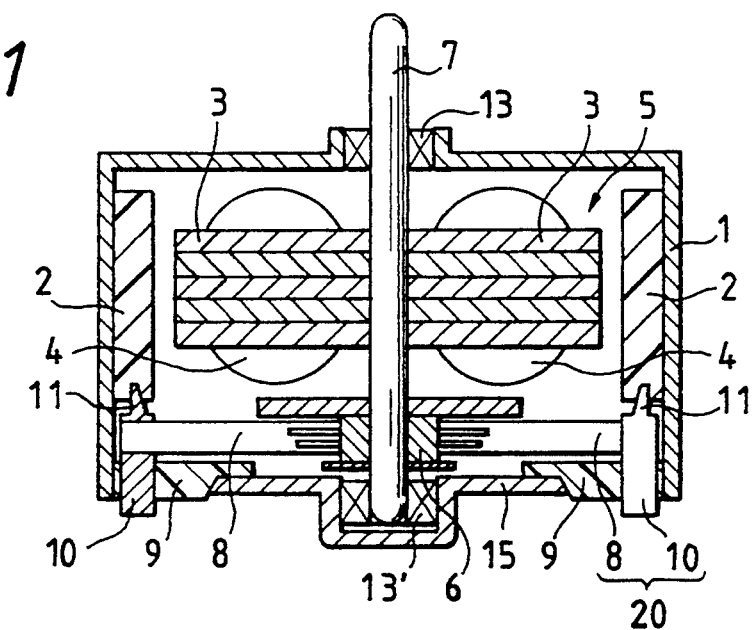
FIG. 1 is a sectional view of a dc motor, which is a first embodiment of the invention.

A dc motor, which is a first embodiment of the invention, will now be described with reference to the drawings. In FIG. 1, an end plate 15 is fitted with and fixed on an open end of a bottomed cylindrical motor frame 1. The end plate 15 has a recessed portion in the middle thereof. Brush body holders 9, 9 made of an insulating resin or the like are fixed at two positions so as to therebetween the recessed portion while passing through the end plate 15 through in the thickness direction thereof. A plurality of terminals (a part of a brush body 20) 10 for supplying the power are firmly embedded by pressure into the respective brush body holders 9, 9. Base portions of brush springs (a part of the brush body 20) 8 are mounted on the terminals 10 on the inner circumferential side of the motor frame 1. Each brush spring 8 extends in a direction orthogonal to a rotating shaft (described later). The front inner end portion of each brush spring 8 is divided into a plurality of slits. From the top of each terminal 10 extends a projecting portion 11 at an acute angle.

Figure 2:
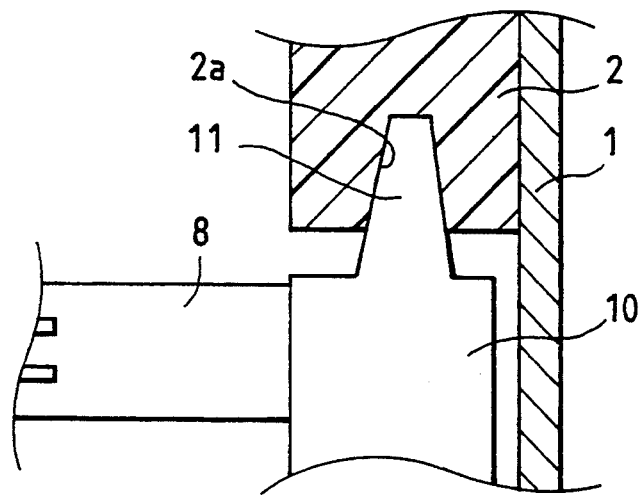
FIG. 2 is a sectional view of a main portion of the o first embodiment of the invention.

A flexible magnet 2 is mounted on the inner circumferential wall of the motor frame 1. As shown in detail in FIG. 2, a receiving hole 2a is formed at a lower end of the flexible magnet 2. The projecting portion 11 of each terminal 10 is inserted into this receiving hole 2a by pressure.

A through hole is formed at the bottom plate of the motor frame 1, i.e., in the middle of the upper end portion of the motor frame 1 as viewed in FIG. 1. Bearings 13, 13' are mounted in the hole and the recessed portion in the middle of the end plate 15, respectively. A rotatable shaft 7 is inserted into the central holes of the respective bearings 13, 13'. The rotatable shaft 7 is supported by the bearings 13, 13' so as to be rotatable relative to the motor frame 1 and the brush body holders 9.

A rotor core 3 is mounted on the rotatable shaft 7 substantially in the middle thereof lengthwise. The rotor core 3 is formed by laminating a plurality of core elements made of a magnetic material. The rotor core 3 has a plurality of radially formed salient poles on the outer circumference thereof, and each salient pole of the rotor core 3 has a winding 4 to form a rotor 5. The external surface of the rotor core 3 confronts the inner surface of the flexible magnet 2 mounted on the inner circumferential wall of the motor frame 1.

Below the rotor core 3 of the rotatable shaft 7 as viewed in FIG. 1 is a commutator 6. The commutator 6 is cylindrical and has a plurality of partially cylindrical segments on the surface thereof. The inner end portion of each brush spring 8 is caused to abut against the surface of the commutator 6 by a resilient force of the brush spring 8. The rotor core 3 is energized by applying the power to the windings 4 through the brush body 20 (the terminal 10 and the brush spring 8) and the commutator 6, so that the rotatable shaft 7 rotates.

According to the first embodiment, the acutely projecting portion 11 is formed on the end portion of each terminal 10 and this projecting portion 11 is inserted into the flexible magnet 2 by pressure. As a result, the rigidity with which the terminal 10 is fixed increases, and displacements of the terminal 10 can thus be prevented. Therefore, even if mechanical and thermal stresses are applied to each terminal 10 from outside the motor, the terminal 10 cannot come out of the brush body holder 9. Vibration caused by the rotation of the rotatable shaft 7 is transmitted from the brush body 20 (the commutator 6 and the brush spring 8) to the terminal 10, and to the flexible magnet 2 by the projecting portion 11 of the terminal 10 in this sequence. The vibration transmitted to the flexible magnet 2 is absorbed by the resiliency of the flexible magnet 2. Thus, the vibrational energy is reduced, and at the same time, the vibration of the brush body holders 9 and the mechanical noise caused by the vibration can be reduced as well.

Figure 3:
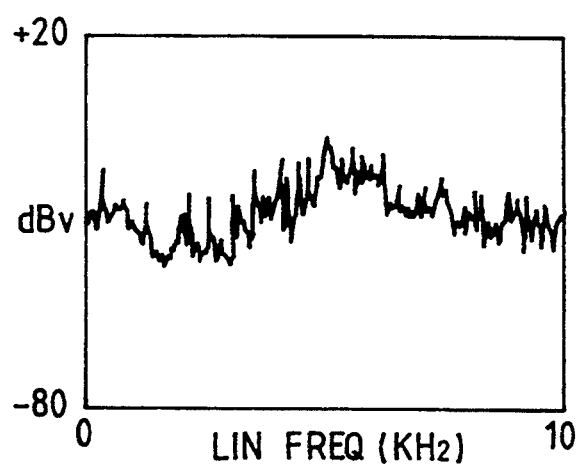
FIG. 3 is a graph showing vibration measurements of the dc motor which is the first embodiment.
Figure 7:
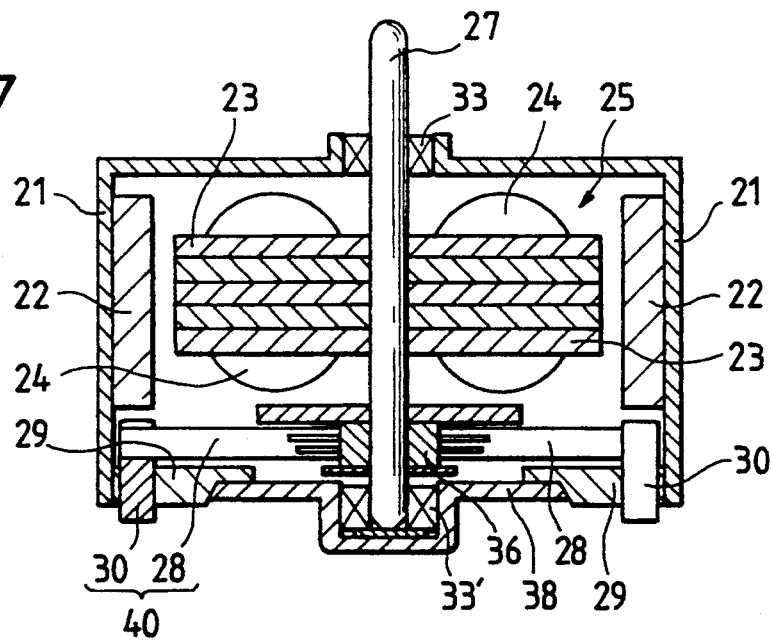
FIG. 7 is a sectional view of an exemplary conventional dc motor.
Figure 8:
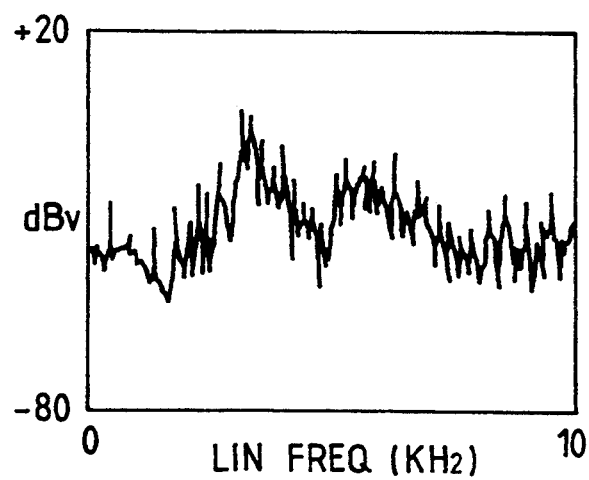
FIG. 8 is a graph showing vibration measurements of the conventional dc motor.

FIG. 3 is a graph showing noise measurements of the dc motor, which is the first embodiment of the invention. As is apparent from the graph showing noise measurements of the conventional dc motor shown in FIG. 7, the first embodiment of the invention exhibits a greater noise reduction in general.

A second embodiment of the present invention will be described hereinafter.

Figure 4:
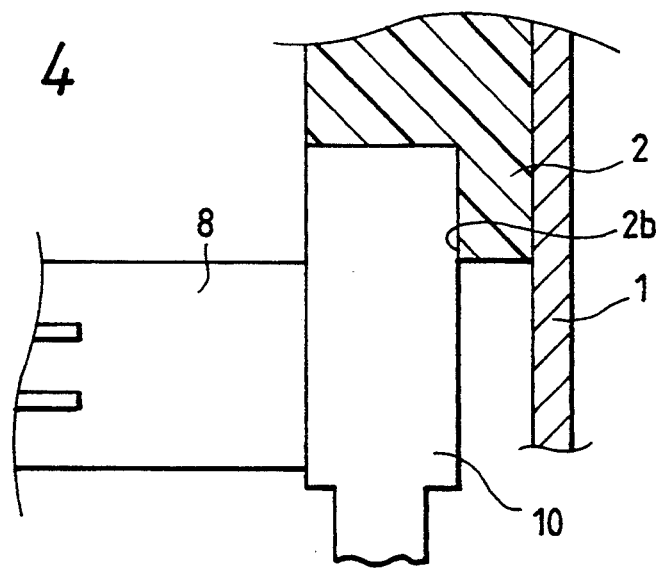
FIG. 4 is an enlarged sectional view of a main portion of a dc motor, which is a second embodiment of the invention.

The terminal 10 as the brush body 20 may be formed integrally with the end plate 15. The profile of the projecting portion 11 of the terminal 10 is not limited to being of acute angle, but may be such that the terminal 10 body is elongated without changing the width thereof as shown in a second embodiment of FIG. 4. In the second embodiment shown in FIG. 4, a cut 2b formed on the flexible magnet 2 may be fitted to the end portion of the terminal 10. While the projecting portion 11 is formed so as to be of an acute angle if the flexible magnet 2 has a matrix made of rubber, such a profile is preferable since burrs and rises produced at the time the projecting portion 11 is inserted by pressure can be prevented. If the flexible magnet 2 has a matrix made of rubber, it is not required to form a hole or a cut on the flexible magnet 2. What may be required is to force the projecting portion onto the flexible magnet 2 so that the flexible magnet 2 becomes hollowed by the resiliency thereof.

A third embodiment of the present invention will be described hereinafter.

Figure 5:
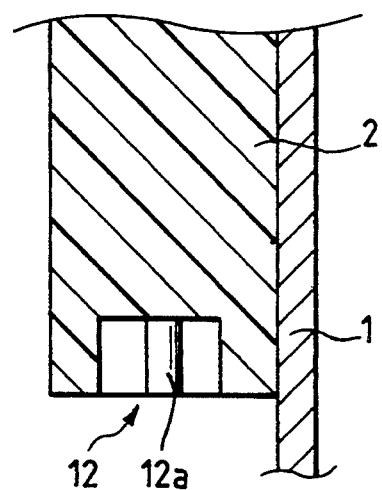
FIG. 5 is an enlarged sectional view showing a a third embodiment) of a flexible magnet that can be used in the dc motors of the invention.
Figure 6:
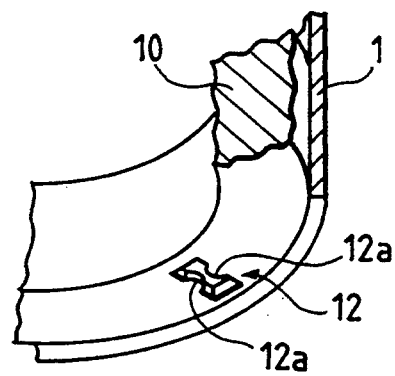
FIG. 6 is a perspective view of the flexible magnet as viewed from the bottom side shown in FIG. 6.

If the flexible magnet 2 has a matrix made of plastic, a hole 12 having arcuate projecting portions 12a, 12a on two confronting sides of a rectangle is formed on the flexible magnet 2 as shown in FIGS. 5, 6 so that the projecting portion 11 of each terminal 10 can be inserted into such hole 12. Such an arrangement contributes to increasing fixing rigidity as well as vibration proofing effects.

While the projecting portion formed on the terminal is fitted to or forced into the flexible magnet in the first to third embodiments, the projecting portion may be formed on each brush spring and such projecting portion may be fitted to or forced into the flexible magnet. As a result of such a design, the same effect as in the above-described embodiments can be obtained.

Further, the brush spring 8 may be made of a metal. A carbon piece may be held on the front end of the brush spring 8.

According to the invention, the projecting portion that projects toward the flexible magnet is formed on the brush body (the terminal or the brush spring), and this projecting portion is secured to the flexible magnet. Therefore, the fixing rigidity of the brush body (the terminal or the brush spring) is improved and the terminal no longer comes out of the brush body holder even if stresses or the like are applied from outside. Further, noise of the brush body (the terminal or the brush spring) is released to the flexible magnet, thereby contributing to reducing not only noise attributable to the rotation of the dc motor but also mechanical noise.

What is claimed is:

1. A dc motor comprising:
    a motor frame;
    a flexible magnet fixed on the motor frame;
    a rotor having a rotor core, the rotor core having windings and confronting the flexible magnet;

a rotatable shaft for rotatable integrally with the rotor;

a commutator secured to the rotatable shaft;

a brush body being in slidable contact with the commutator and supplying power to control driving of the rotor;

a brush body holder, made of an insulating resin, for holding the brush body; and engaging means for engaging the brush body with the flexible magnet, wherein said terminal is provided with a projection projecting toward a side of the flexible magnet and the projection is secured to the flexible magnet.

2. A dc motor according to claim 1, wherein the brush body includes:

a brush spring for sliding on the commutator; and a terminal for holding the brush spring and for supplying power to control the driving of the brush body.

3. A dc motor as claimed in claim 2, wherein the brush body includes the engaging means.

4. A dc motor as claimed in claim 3, wherein said flexible magnet has a recess for embedding the projection provided with the terminal.

5. A dc motor as claimed in claim 3, wherein the brush spring is provided with a projection projecting toward a side of the flexible magnet and the projection is secured to the flexible magnet.

6. A dc motor as claimed in claim 5, wherein said flexible magnet has a recess for embedding the projection provided with the terminal.

7. A dc motor according to claim 1, wherein the flexible magnet is made of rubber.

8. A dc motor according to claim 1, wherein the flexible magnet is made of plastic.

* * * * *